United States Patent [19]

Murer et al.

[11] 3,983,295

[45] Sept. 28, 1976

[54] RIGID OR SEMIRIGID FOAMS AND PROCESS OF MAKING THEM

[75] Inventors: Angelo Murer, Brussels; Mario Borsatti, Overijse, both of Belgium

[73] Assignee: Exxon Research and Engineering Company, Linden, N.J.

[22] Filed: Nov. 7, 1974

[21] Appl. No.: 521,926

Related U.S. Application Data

[63] Continuation-in-part of Ser. No. 298,454, Oct. 17, 1972, abandoned.

[52] U.S. Cl. .............................. 428/315; 260/2.5 P; 264/45.5; 264/53; 264/236; 264/331; 264/DIG. 14; 428/71
[51] Int. Cl.² .................................................. B29D 27/04
[58] Field of Search ............... 264/52, 53, 236, 331, 264/DIG. 14, 45.5; 260/2.5 P; 428/320, 315, 71

[56] References Cited
UNITED STATES PATENTS

| | | | |
|---|---|---|---|
| 3,066,110 | 11/1962 | Cornell | 260/2.5 P |
| 3,365,353 | 1/1968 | Witman | 264/52 X |
| 3,770,662 | 11/1973 | Hennessy et al. | 260/2.5 P |
| 3,786,004 | 1/1974 | Furuya et al. | 260/2.5 P X |
| 3,804,933 | 4/1974 | Allan et al. | 264/52 |
| 3,855,160 | 12/1974 | Shiotsu et al. | 260/2.5 P X |
| 3,857,915 | 12/1974 | Crowley | 264/52 |

*Primary Examiner*—Philip Anderson
*Attorney, Agent, or Firm*—Henry E. Naylor

[57] ABSTRACT

A rigid or semi rigid self-skinned cellular plastic structure which is heat recoverable and thermoelastic is prepared by a process wherein a plastisol or pregelified dry-blend of a homo- or copolymer of vinylchloride (PVC dispersion resin), a polymerizable polyfunctional allyl or vinyl monomer (o-diallyl phthalate), and a peroxide catalyst is prepared, and the plastisol or dryblend is heated so that the reacting mass is free to expand without restraint in at least one direction with a temperature rise of 10°–30°C/minute at least up to the temperature at which expansion of the reaction mass starts. This cellular structure is rigid at normal temperatures and behaves like an elastomer at high temperatures. The product can be subjected to fabrication techniques such as sheet molding, encapsulation expansion from compressed foam etc.

29 Claims, No Drawings

RIGID OR SEMIRIGID FOAMS AND PROCESS OF MAKING THEM

CROSS REFERENCE TO RELATED APPLICATION

This is a continuation-in-part of U.S. application Ser. No. 298,454, filed on Oct. 17, 1972 and now abandoned.

BACKGROUND OF INVENTION

This invention relates to a method of preparing a heat recoverable thermoelastic plastic foam derived from the reaction of poly (vinyl chloride) homopolymers and copolymers with polymerizable polyfunctional allyl or vinyl compounds.

Many processes are known in the art for preparing a variety of foamed products. One such process, as taught in U.S. Pat. No. 3,770,662, is a process for preparing a foamed fluroelastic article which comprises precuring a material consisting of a blowing agent, a polyfunctional methacrylate crosslinking agent, and an organic peroxide, and then blowing this material to produce a multitude of small cells therein. Another process for preparing foamed products is shown in U.S. Pat. No. 3,267,051, which teaches a method for manufacturing rigid cellular products which consist of a saturated halogenated hydrocarbon, a mixture containing polyvinyl chloride, a polyisocyanate, a swelling agent, and at least one vinylidenic monomer. The method of preparing this rigid cellular product comprises several steps including heating under pressure and cooling under pressure.

Other methods for preparing foamed products are found in U.S. Pat. No. 3,308,074 and U.S. Pat. No. 3,413,244. These methods require, as do many others in the prior art, a multistep process using pressure and blowing agents.

SUMMARY OF INVENTION

It has now surprisingly been found that a selfskinned foam which is both thermoelastic and heat recoverable, can be made by a one-step process without the use of blowing agents or pressures in excess of atmospheric pressure. This invention relates to a novel method of producing such a self-skinned structure. This invention overcomes the need for a multistep process in which both blowing agents and pressures of greater than atmospheric pressure are used. In particular, this invention is a one-step process wherein a plastisol or pregelified dry-blend of a homo- of copolymer of vinyl chloride (PVC dispersion resin), a polymerizable allyl or vinyl monomer, and a peroxide catalyst is prepared, and wherein the plastisol or dry-blend is heated at a critical rate of heating (10°–30°C. per minute) so that the reacting mass is free to expand without restraint in at least one direction. This cellular product is rigid at normal temperatures, but behaves like an elastomer at elevated temperatures. This invention is advantageous over the prior art in view of the fact that simplified molding techniques can be used. The cost of mold construction is also reduced because the present invention does not require a mold which must withstand high pressures. This invention also allows one to obtain an end product of larger dimension per unit material over the prior art.

DETAILED DESCRIPTION

It is an important object of the present invention to provide rigid and semirigid foams with thermoelastic properties. By the term "rigid" we mean a plastic substance having at compact structure, a modulus of elasticity of more than 7000 Kg/cm$^2$, and by the term "semi-rigid" we mean a plastic substance having at compact structure, a modulus of elasticity of from 700–7000 Kg/cm$^2$. A thermoelastic material as it is used in the specification and claims means a material which is rigid at climatic temperatures, which range from as low as −60°C to as high as 75°C, and behaves like an elastomer at higher temperatures. The transition temperature will be in the range of 70° to 95°C or higher depending on the type of formulation and cure level reached.

By heat recoverability we mean a cellular substance which passes the following test:

A cube of the cellular substance (foam) with dimensions 6 × 6 × 6 cm is heated to 120°–150°C and cooled under pressure to obtain a mass having dimensions, 6 × 6 × 2 cm with an increased density (three times). The sample is immediately, or after one week or longer, again warmed up above the transition temperature (120°–150°C), the foam expands rapidly and recovers its original form and structure as well as density.

This particular property of heat recoverability is of considerable advantage to prepare end-articles with different levels of density as well as to apply fabrication techniques like sheet molding, encapsulation, expansion from compressed forms, etc.

It is a further object of the present invention to provide a process to convert directly a plastisol (paste) of a poly (vinylchloride) or copolymer and a polymerizable polyfunctional allyl or vinyl monomer into a rigid, heat-recoverable celular structure by a one-shot expansion technique.

Accordingly the invention provides a rigid or semi-rigid selfskinned cellular structure which is heat recoverable and thermoelastic (as hereinbefore defined) and which comprises the expanded product of a plastisol or pregelified dry blend of a vinyl chloride homo or copolymer and a polymerizable allyl or vinyl polyfunctional monomer. The product comprises polyallyl or polyvinyl chains grafted on a poly (vinylchloride) backbone. The product may if desired by produced using additional stabilizers for fillers. Usually the product has the following characteristics:

Density: 0.08 – 0.95 g/cc
Compression strength (10%): 5 – 120 kg/cm$^2$
Thermal dimensional stability: 1 week at 140°C
Low meter imbibition: 20 – 40% density increase after 24 hours of immersion The cellular structure further possesses the properties of being self-extinguishing, and having good machinability and excellent finishability.

The plastisol compositions according to this invention are derived from mixtures of a thermoplastic polymer and a polymerizable allyl or vinyl polyfunctinal monomer. The thermoplastic polymer portion may be a polymer prepared from chlorovinyl groups or a copolymer of different compatible polymers containing vinyl groups. The preferred polymer is PVC or a PVC copolymer containing at least 80% vinylchloride. Examples of copolymers are those wherein VCM is copolymerized with another vinyl monomer such as vinyl acetate, vinylidene chloride, various diallyl maleates including ethyl and butyl maleate, diallyl acrylates including ethyl and butyl acrylate, etc.

The reaction blend of the vinyl chloride polymer and the polyfunctional monomer is preferably in plastisol form, but a dry-blend, partially gelified, may also be used.

As used in this invention, the term "plastisol" can be defined as a fluid homogeneous mixture of a PVC resin and a plasticizer wherein the PVC resin is dispersed in a liquid able to form, after gelification, a plasticized compound.

The preferred PVC resin used in preparing the plastisol of this invention is a dispersion type resin which is polymerized by either emulsion or suspension. It is preferable that this PVC resin have a very low plastisol viscosity; most perferably, in the range of about 2000 to about 20,000cps at 20°C and a high K-value, preferably from about 45 to about 90.

The term "dispersion type resin" as used in the specification and claims means a PVC resin having very small spherical particles permitting them to be mixed with plasticizers by simple conventional stirring techniques. The dispersion type resins suitable for use in this invention generally have a particle size range of about 0.1 to about 5.0 microns and preferably a particle size range of about 0.5 to 2.0 microns.

The term "K-value" as used in the specification and claims is a number calculated from dilute solution viscosity measurements of a polymer and is used to denote the degree of polymerization or molecular size. The K-value is calculated by use of the following formula:

$$\frac{\log (Ns/No)}{C} = \frac{75k^2}{1 + 1.5kc} + k$$

Where
$Ns$ = viscosity of the solution
$No$ = viscosity of the solvent
$c$ = concentration in grams per ml
$K = 1000\ k$ See Whittington's Dictionary of Plastics by Lloyd R. Whittington, Technomic Publishing Co., 1968.

The term "dry-blending" as used in this invention means the incorporation, by absorption, of a plasticizer in a PVC powder.

A PVC extender type resin normally cannot form a stable plastisol by itself with plasticizers in view of the fact that its particle size is not sufficiently small enough. However, such an extender type resin can be used in minor amounts with the dispersion type resin. For example, about 10 to about 50% by weight (based on the weight of the dispersion resin) of an extender type resin may be used with the dispersion resin.

For special purposes the reaction blend may be formed by dry-blending followed by absorption of the monomer and pregelification of the dryblend, in which case normal dry blending types of PVC resin may be used. It is preferred, however, to prepare a plastisol.

The amount of polymerizable allyl or vinyl polyfunctional monomer present may vary from about 20 to about 300 parts by weight per 100 parts by weight of thermoplastic polymer. Preferably the amount is less than the thermoplastic polymer present and is between 40 and 80 parts by weight per 100 parts by weight of thermoplastic polymer.

The term "polyfunctional monomer" as used in the specification and claims means any monomer having more than one reaction site. Such monomers include condensation reactants and a wide range of monomers having unsaturation and other functional groups such as acids, hydroxyls, amines, halogens, adehydes, epoxies, sulfur compounds, lactons, nitro groups, organometallic groups etc.

The polyfunctional monomers suitable for use in this invention are preferably non-volatile and contain those groups known to have a solvating and plasticizing effect on the thermoplastic vinyl polymer. Illustrative of such groups, although not intending to be limited thereby, are the ester, amide and epoxy groups.

The term "non-volatile polyfunctional monomer" as used in the specification and claims means those polyfunctional monomers having a boiling point of at least 180°C.

A great number of polyfunctional allyl monomers can be used such as acrylates, maleates, fumarates, phthalates, cyanurates etc. Such monomers comprise: polyallyl esters such as diallyl phthalate, diallyl adipate, diallyl sebacate, triallyl cyanate, diallyl terephthalate, diallyl isophthalate, diallyl maleate, triallyl trimellitate and tetra-allyl pyromellitate, diallyl and triallyl phenols and their esters, phosphates, epoxides and ethers such as orthoallyl phenyl allyl ether; allyl carbonates such as bisallyl diethylene glycol carbonate, methallyl and crotonyl esters and ethers. Suitable polyfunctional vinyl monomers include divinyl and trivinyl hydrocarbons such as divinyl benzene, 1,4-divinyl-2,3,5,6-tetrachlorobenzene, and trivinylbenzene.

Although a polyfunctional monomer must be used in the present invention in order to obtain a thermoelastic product, a monofunctional monomer can also be used in conjunction with the polyfunctional monomer. Illustrative of a mixture of mono- and polyfunctional monomers suitable for use in this invention is a mixture comprising 75 parts of diallyl maleate, 15 parts of allyl chloride and 10 parts of divinyl benzene, wherein said parts represent percent by volume based on the total mixture.

In view of degradation which is associated with PVC at elevated temperatures, a stabilizer must be used in this invention. Stabilizers which are suitable for use in this invention include the lead compounds such as dibasic lead phosphite, dibasic lead stearate and dibasic lead phthalate. Other stabilizers suitable for use in this invention include those stabilizers disclosed in the book "Polyvinyl Chloride" by Harold A. Sarvetnick, Reinhold Plastics Applications Series, 1969 on pages 98–100. The preferred stabilizers are the lead compounds and most preferred is dibasic lead phosphite. The amount of stabilizer added is about 1 to about 5 part per 100 parts by weight of thermoplastic polymer. Such stabilizers are especially needed when the foam of the present invention has to be reheated in any postforming operation.

Conventional fillers may also be used in the practice of the invention and the amount and type used will depend on the final properties one wishes in his product. As is evident to those skilled in the art such properties as strength and flexibility can be modified by the amount and type of filler used. For the preparation of semirigid structures of this invention where a modifier is used, a minor amount of conventional plasticizer may be used; otherwise, conventional plasticizers should not be used. Illustrative of some conventional fillers which are suitable for use in this invention are calcium carbonate, kaolin, titanium dioxide etc. As further reinforcement in the foam of this invention, expanded metal, glass-fibers, absestos, talc and polyacrylonitrile fibers may be used. The total amount of filler may be as high as about 100 parts by weight per 100 parts by weight of thermoplastic polymer.

Catalyst suitable for use in the present invention include the conventional organic and inorganic peroxides such as dicumyl peroxide and/or a mixture of t-butyl peroctoate and t-butyl perbenzoate.

The reaction blend may further contain a second polymeric "modifier" component, which is defined as a polymer which is compatible with the poly (vinylchloride) and modifies its physical characteristics. Examples of modifiers are: acrylonitrile butadiene styrene resins, methacrylate butadiene styrene resins, acrylonitrile butadiene acrylate resins, ethylene/vinyl acetate copolymers, acrylic polymers. Another modifier is chlorinated polyethylene. Also elastomeric polymers, such as EPR and EPDM, butyl rubbers, nitrile rubbers, SBR rubbers, acrylic rubbers, natural rubber and various other high or low unsaturation rubbers can be used. They can be added in amounts of 5 to 100 parts by weight but preferably they are present in subordinate amounts of 5 to 30 parts by weights per 100 parts by weight PVC powder. Suitably these modifiers are added just before pouring of the plastisol to minimize the viscosity increase or the solvation.

The specific heat-recoverable rigid or semirigid foam is obtained by a selective reaction condition which can be regarded as a one-shot expansion process and where the heating procedure, conducted so that the reacting mass (foam) is free to expand without restraint in at least one direction, is critical. This selective heating procedure which is based on the initial viscosity, the gelation rate, fusion rate and cure rate of the plastisol is characterised by a rapid temperature gradient of about 10 to about 30°C/minute up to the temperature of the rapid cure rate of the monomer, i.e., where expansion of the reaction mass starts. In this way, the free surface of the reaction mass forms a skin of sufficient thickness to help the rise of the structure under expansion. The expansion ratio is also regulated by other factors such as the initial thickness of the plastisol, the heat transmission of the support and the ventilation which has to be minimized. A particularly suitable heating ratio produces a temperature gradient of 15° to 25°C/minute.

The high temperature gradient is an important reaction condition in reaching the cure peak under such circumstances that a rapid polycyclization occurs, generating a high exothermal condition. When such a condition is reached the expansion of the mass is caused by local boiling spots under a progressively increasing visocity of the crosslinking mass. The temperature at which such a one-shot expansion occurs depends on the type of allyl or vinyl monomer used and will be between about 110°–170°C. Thus generally, the preheating period used needs not be longer than 10–15 minutes to initiate the rise. The reaction is preferably carried out in such a way, that the free surface of the mass is heated by convection and with a lower gradient of temperature increase. The initial resin to monomer ratio is related to the initial viscosity and the plastisol and to its fusion rate; it should generally be such so as to obtain a viscosity within the range of 2,000 to 50,000 cps at 20°C. The preferred viscosity range is from 2,000 to 10,000 cps at 20°C. The initial thickness of the plastisol also determines the level of expansion of the final foam. Expansion ratios of 2 to 12 (volume) are possible.

A preferred method of preparing the foams of this invention is to first prepare a plastisol by simple stirring methods. The plastisol is then poured into an open mold and heated in a preheated oven so to obtain a heating rate of about 10° to about 30°C/minute. The mold may be metal or made of any other heat-conductive material. It will be evident to those skilled in the art that the temperature to which the oven is preheated is that temperature which would allow one to achieve a heating rate of about 10° to about 30°C/minute. This temperature may vary depending on the material of the mold, the thickness of the plastisol layer etc. For practical purposes, the thickness of the plastisol layer in the mold will be from about 0.1 to about 10 cm and the heating period is generally from about 5 to about 15 minutes for a plastisol layer of 1 cm and a longer period in proportion to the thickness of a thicker plastisol layer.

It will be obvious to one of ordinary skill in the art that any heat-conducting mold may be used as long as the plastisol is free to expand in one direction. Such molds include not only open molds, but also these molds that may in fact be closed, but would also allow the plastisol to freely expand in one direction. The choice of a mold suitable for use in the invention is dictated by the final product one wishes to produce.

The products of this invention can be advantageously subjected to such transformation techniques as reaction casting, liquid injection, roto forming, dipping, spraying etc. by the use of simple inexpensive molds.

EXAMPLES 1–9

In the following table, 9 different formulations are illustrated which were made mainly from a dispersion PVC with a low plastisol viscosity (3,000 cps at room temperature) and a K-value = 73 having an average particle size of 2 microns.

| Components | Examples | | | | | | | | |
|---|---|---|---|---|---|---|---|---|---|
| | 1 | 2 | 3 | 4 | 5 | 6 | 7 | 8 | 9 |
| PVC paste type | 100 phr | 100 phr | 100 phr | 100 phr | 100 phr | 100 phr | 100 phr | — | 100 phr |
| Polyfunctional monomer | 66 | 50 | 66 | 200 | 300 | 66 | 100 | 50 | 66 |
| Catalyst | 0.8 | 0.8 | 1 | 2 | 1.5 | 0.8 | 1 | 1 | 0.8 |
| Stabilizer | 4 | 5 | 5 | 5 | 4 | 5 | 8 | 5 | 4 |
| Filler | — | — | — | — | 20 | 10 | — | — | — |
| Modifier | — | — | 15 | 30 | 50 | — | — | — | 5 |
| PVC extender type | — | 10 | — | 20 | — | — | 60 | — | — |
| PVC dry-blending type | — | — | — | — | — | — | — | 100 | — |

-continued

| Components | Examples | | | | | | | | |
|---|---|---|---|---|---|---|---|---|---|
| | 1 | 2 | 3 | 4 | 5 | 6 | 7 | 8 | 9 |
| Plasticizer | — | — | — | — | — | — | — | — | 15 | phr = parts per hundred based on weight

The polyfunctional monomer was ortho-diallylphthalate, industrial grade, and the catalyst dicumylperoxide (40% supported on calcium carbonate). In examples 2, 4, and 7 an extender type of PVC resin with a particle size of 50 microns was added. In example 8 a compounding PVC resin of K = 60 was used to prepare the dryblend at 80°C. The pregelification was made on mill-rolls at 105°C for 5 minutes before the addition of the catalyst. A sheet of 5 mm. thickness was then pressed 2 minutes at 110°C. Examples 3 and 4 contained ABS resin as a modifier, added just before pouring the plastisol. In example 5 a PVC containing ethylene/vinyl acetate copolymer as modifier and calcium carbonate as filler was used. In example 6 the filler was glass fibre. In example 9 a polyadipate plasticizer was added. In all cases the stabilizer was diabasic lead phosphite.

A plastisol layer of 0.8 cm was put on an aluminum tray of area 25 × 40 cm. The tray was placed in an electrically heated oven, without air circulation, which was heated to 180°C. The heat was generated in such a way that the warming-up of the plastisol increased at a rate of 15°C/minute. After 11 minutes the reaction started at 159°C and the rise time was 7 minutes. At the end of the setting-up the thickness of the mass was 3.4 cm. The color of the free skin was ivory and the internal foam colors were light reddish-brown. In all cases the mold pattern could be reproduced when repeating the experiment.

The product according to Example 1 was reheated to 150°C and then cooled under pressure to obtain a layer of 1 cm. On heating-up again, after 24 hours, to 180°C the foam expanded and recovered its original form and dimensions. It had a compression strength (10%) of 32 kg/cm$^2$, a density of 0.35 g/cc, a good dimensional stability and low water imbibition.

EXAMPLE 10

A plastisol was prepared using the following formulation:

Thermoplastic polymer — PVC (dispersion type):150 phr (based on weight)
Polyfunctional monomer — Diallyl Phthalate: 100 phr
Catalyst — Dicumyl Peroxide (40%): 5 phr
Stabilizer — Dibasic Lead Phosphite: 5 phr The plastisol was placed in an open stainless steel mold having dimensions of 20 cm × 0.8 cm. The mold with the plastisol was placed in an oven which had been preheated to 190°C and the temperature of the oven increased to its maximum of about 200°C. The plastisol heated at a rate of 15°C/minute and at the end of 14 minutes a foam with a density of 0.25 g/cc was produced.

This example demonstrates that under conditions similar to the above, a foam is obtained from a plastisol by a one step process.

EXAMPLE 11

A plastisol was prepared using the same formulation of Example 10.

The plastisol was placed in an open stainless steel mold having dimensions of 20 cm × 12 cm × 0.8 cm. The mold with the plastisol was placed in an oven at room temperature and the oven turned on so that its maximum temperature of 200°C could be obtained. After about two hours the oven had reached its maximum temperature; the plastisol had heated at a rate of about 6°c/min, and a solid mass was formed having a density of 1.290 g/cc.

This example demonstrates the necessity of a heating rate high enough to produce a foam. Here the heating rate was too slow and thus a solid mass in lieu of a foam was formed.

EXAMPLE 12

A plastisol was prepared using the same formulation as indicated in Example 10.

The plastisol of this example was also placed in an open stainless steel mold having dimensions of 20 cm × 12 cm × 0.8 cm and the plastisol containing mold placed in an oven which had been preheated to 290°C. In view of the fact that the maximum temperature of the oven is about 200°C, a heated metal block was placed in the oven to generate a 290°C temperature therein and the mold was placed directly on said metal block. The plastisol had a heating rate of 30°C/minute and as such it initially began to foam very rapidly. Shortly after the initial foaming, the plastisol abruptly collapsed in view of the fact that the system was unable to cure at such a rapid rate.

This example illustrates that when the heating rate is too rapid a foam will not be produced, but instead a collapsed mass will result. These last three examples clearly illustrate the criticality of the plastisol heating rate in the practice of this invention.

In all the above examples the heating rate of the plastisol was measured by immersing a thermocouple in the plastisols at a point having the coordinates of 5 cm length, 3 cm width and 0.4 cm height relative to the stainless steel mold.

What is claimed is:

1. A method for preparing a heat recoverable thermoelastic self-skinned cellular plastic structure consisting essentially of:
    A. preparing a vinyl chloride composition, wherein said composition is a plastisol or a pregelified dry-blend of:
        1. a dispersion type vinyl chloride polymer;
        2. a non-volatile polymerizable polyfunctional monomer selected from the group consisting of allyl and vinyl monomers;
        3. a peroxide catalyst; and
    B. depositing said composition in an open mold cavity;
    C. heating said vinyl chloride composition at a rate of about 10°C. to about 30°C./minute to at least the temperature at which said monomer rapidly cures and expansion of the reaction mass commences in said mold cavity wherein the vinyl chloride composition is free to expand in at least one direction.

2. The method of claim 1 wherein the dispersion type vinyl chloride polymer is a dispersion type polyvinyl chloride.

3. The method of claim 1 wherein the dispersion type vinyl chloride polymer is a copolymer of a dispersion type vinyl chloride and a second vinyl monomer.

4. The method of claim 1 wherein the vinyl chloride composition is heated to a temperature of about 110°C. to about 200°C.

5. The method of claim 1 wherein the polyfunctional monomer is selected from the group consisting of O-diallylphthalate, diallyl maleate and divinyl benzene.

6. Th method of claim 1 wherein a stabilizer is used.

7. The method of claim 6 wherein the stabilizer is selected from the group consisting of lead salts, organo tins, tin mercaptides, barium-cadminum-zinc compounds, calcium-zinc conpounds, polyols and nitrogen compounds.

8. The method of claim 1 wherein the peroxide catalyst is an organic peroxide.

9. The method of claim 8 wherein the organic peroxide is dicumyl peroxide.

10. The method of claim 1 wherein the peroxide catalyst is an inorganic peroxide.

11. The method of claim 1 wherein the dispersion type vinyl chloride polymer has a viscosity of about 2000 to 20,000 cps. at 20°C.

12. The method of claim 1 wherein the dispersion type vinyl chloride polymer has a particle size of about 0.1 to about 5.0 microns.

13. The method of claim 1 wherein the dispersion type vinyl chloride polymer has a particle size of about 0.5 to about 2.0 microns.

14. The method of claim 1 wherein the dispersion type vinyl chloride polymer has a K value of about 45 to about 90.

15. The method of claim 1 wherein conventional fillers are incorporated.

16. The method of claim 1 wherein the heating rate is about 15°C. to about 25°C. per minute.

17. The product of claim 1.

18. A method of preparing a heat recoverable thermoelastic self-skinned cellular structure consisting essentially of:
  A. preparing a plastisol from:
    1. a dispersion type vinyl chloride polymer said plastisol having a viscosity of about 2,000 to about 20,000 cps, said polymer having a particle size of about 0.1 to about 5.0 microns and a K-value of about 45 to about 90;
    2. a polymerizable polyfunctional monomer having a boiling point of at least 180°C. selected from the group consisting of allyl and vinyl monomers;
    3. an organic peroxide;
    4. a polyvinyl chloride stabilizer; and
  B. depositing said plastisol in an open mold cavity;
  C. heating said plastisol to a temperature of about 10°C. to about 30°C./minute to at least a temperature at which said monomer rapidly cures and the expansion of the reaction mass commences in said mold cavity wherein said plastisol is free to expand in at least one direction.

19. The method of claim 18 wherein the dispersion type vinyl chloride polymer is a dispersion type polyvinyl chloride.

20. The method of claim 18 wherein the dispersion type vinyl chloride polymer is a copolymer of a dispersion type vinyl chloride and a second vinyl monomer.

21. The method of claim 18 wherein the plastisol is heated to a temperature of about 110°C. to about 200°C.

22. The method of claim 18 wherein the polyfunctional monomer is selected from the group consisting of O-diallylphthalate, diallyl maleate and divinyl benzene.

23. The method of claim 18 wherein the organic peroxide is dicumyl peroxide.

24. The method of claim 18 wherein the plastisol is heated at a rate of about 15°C. to about 25°C. per minute.

25. The method of claim 18 wherein the amount of polyfunctional monomer used is from about 20 to about 300 parts by weight per 100 parts by weight of vinyl chloride polymer.

26. The method of claim 18 wherein the amount of polyfunctional monomer used is from about 40 to about 80 parts by weight per 100 parts by weight of vinyl chloride polymer.

27. The method of claim 18 wherein the plastisol is heated for a period of about 5 to about 15 minutes per centimeter thickness of said plastisol.

28. The method of claim 18 wherein a second polymeric compound selected from the group consisting of an acrylonitrile-butadiene-styrene resin, a methacrylate-butadiene styrene resin, an acrylonitrile-butadiene acrylate resin, an ethylene/vinyl acetate copolymer, an acrylic polymer and a chlorinated polyethylene is added to the plastisol.

29. The method of claim 28 wherein the second polymeric compound is added in the amount of about 5 to about 100 parts by weight per 100 parts by weight of the vinyl chloride polymer.

* * * * *